(12) United States Patent
Tsuria

(10) Patent No.: US 11,980,820 B2
(45) Date of Patent: May 14, 2024

(54) METHODS, DEVICES, AND SYSTEMS FOR COUNTERING CHEATS IN GAMES

(71) Applicant: Synamedia Limited, Staines Upon Thames (GB)

(72) Inventor: Yosef Tsuria, Jerusalem (IL)

(73) Assignee: Synamedia Limited, Staines Upon Thames (GB)

( * ) Notice: Subject to any disclaimer, the term of this patent is extended or adjusted under 35 U.S.C. 154(b) by 67 days.

(21) Appl. No.: 17/672,943

(22) Filed: Feb. 16, 2022

(65) Prior Publication Data

US 2023/0256346 A1 Aug. 17, 2023

(51) Int. Cl.
| | | |
|---|---|---|
| *A63F 13/75* | (2014.01) | |
| *A63F 13/35* | (2014.01) | |
| *A63F 13/822* | (2014.01) | |
| *G06N 3/02* | (2006.01) | |
| *H04L 9/40* | (2022.01) | |

(52) U.S. Cl.
CPC ............... *A63F 13/75* (2014.09); *A63F 13/35* (2014.09); *A63F 13/822* (2014.09); *G06N 3/02* (2013.01); *H04L 63/1425* (2013.01); *A63F 2300/535* (2013.01); *A63F 2300/5586* (2013.01)

(58) Field of Classification Search
None
See application file for complete search history.

(56) References Cited

U.S. PATENT DOCUMENTS

| | | | | |
|---|---|---|---|---|
| 7,288,027 B2 * | 10/2007 | Overton | ................... | A63F 13/75 463/43 |
| 9,694,286 B2 * | 7/2017 | Khabazian | ............... | A63F 13/75 |
| 10,134,231 B2 * | 11/2018 | Takeda | ................ | G07F 17/3213 |
| 11,040,285 B1 * | 6/2021 | Lundquist | ........... | A63F 13/5375 |
| 11,273,380 B1 * | 3/2022 | Feeney | ................... | A63F 13/75 |
| 2004/0242321 A1 * | 12/2004 | Overton | .................. | A63F 13/75 463/29 |
| 2022/0180173 A1 * | 6/2022 | Jonnalagadda | .......... | G06N 3/04 |

OTHER PUBLICATIONS

Daiping Liu et al., "Detecting Passive Cheats in Online Games via Performance-Skillfullness Inconsistency," 2017 47th Annual IEEE/IFIP International Conference on Dependable Systems and Networks (DSN), IEEE, 2017, pp. 615-626.

* cited by examiner

*Primary Examiner* — Ronald Laneau
(74) *Attorney, Agent, or Firm* — Fernando & Partners, LLP

(57) ABSTRACT

Techniques for countering cheats in a multi-player gaming environment are described herein. In accordance with various embodiments, a server includes a cheating analyzer running on processor(s) and a non-transitory memory for storing cheat data and counter cheat data. The server identifies suspected cheating in a game and determines a probability of the suspected cheating based on the cheat data. The server also selects a counter cheat of the suspected cheating corresponding to the probability value based on the cheat data and the counter cheat data. The server then applies the counter cheat approximate the probability value in the game. In some embodiments, the server deploys local copies of the cheating analyzer to client devices, including sending at least a portion of the cheat data and/or counter cheat data. The local copies facilitate the cheat identification, the probability determination, the counter cheat selection, and/or the application of the counter cheat.

20 Claims, 10 Drawing Sheets

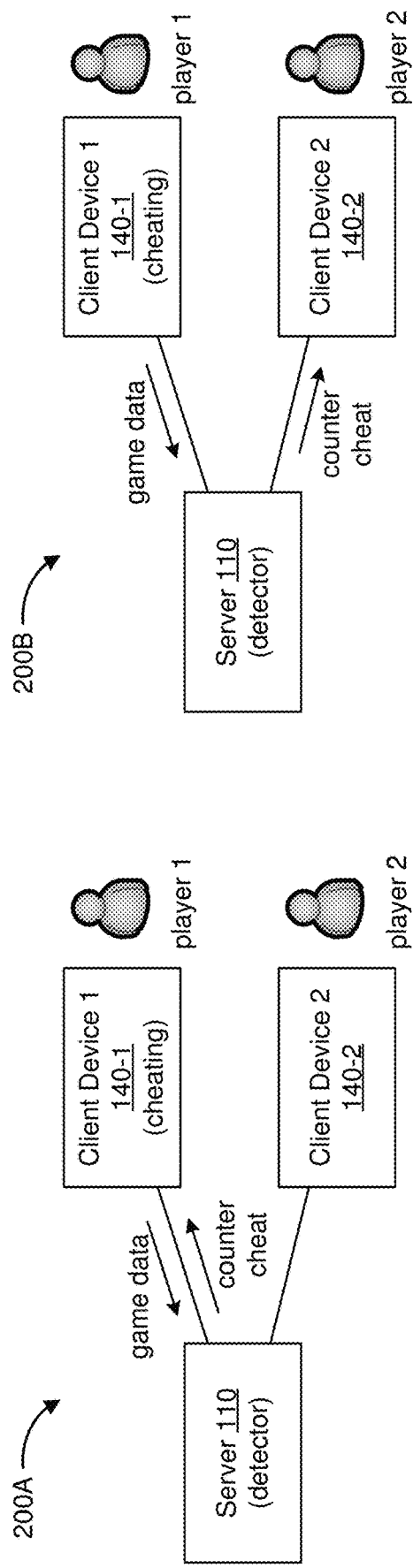
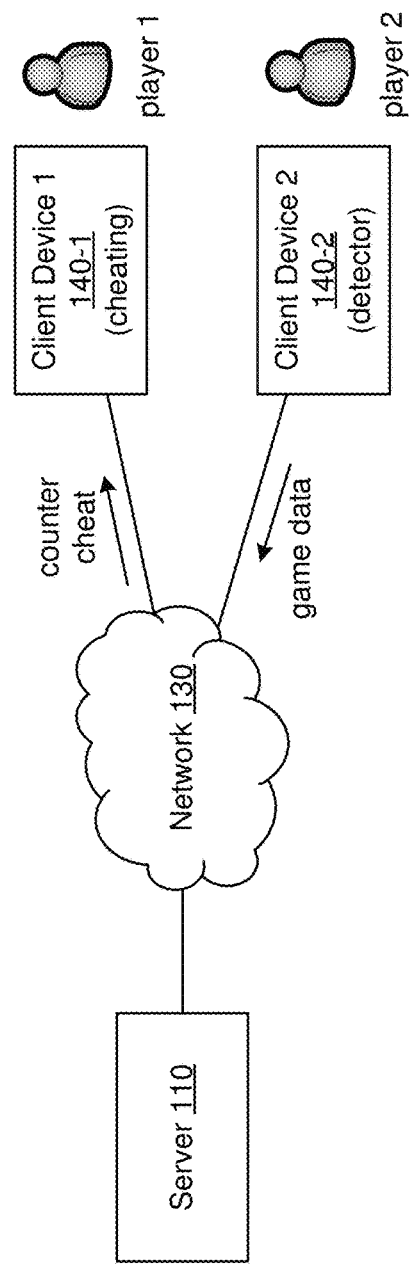
Figure 2A
Figure 2B
Figure 2C

| Persona | Motive | Act of Cheating | Counter Cheat Type |
|---|---|---|---|
| Super Hero | gain super power to help winning | - super speed/vision<br>- walk on water<br>- super sniper | - impair character's vision<br>- cripple, shake, slow hands |
| Prophet | - know the future<br>- see everything | - get a map of the game before everybody else<br>- know about secret moves of opponent | - provide to cheater false information/view |
| Corrupt Clerk | change data (own/others) | - gain badges and money<br>- change opponent data | - corrupt cheater's data to make data unsafe and unstable |
| Cracker | destroy other's work/achievements | network attack on other's communication | - create force majeure to destroy cheater's assets |

Figure 4

| Cheat Data (by player 1 at device 1) | Probability | Detected By (e.g., server/client/human) | Counter Cheat Type | Counter Applied By | Counter Cheat |
|---|---|---|---|---|---|
| moved 5 units in 2 seconds | 70% | human | extra speed <-> super hero | device 2 - player 2 | give player 2 extra speed for a given time |
| transparent walls | 90% | client device 2 | fog <-> super hero | server | disable/fog view for player 1 for 30 seconds |
| aim-bot #1 | 40% | client device 3 | aim-bot <-> super hero | device 2 - player 2 | enhance player 2 with super weapon for 1 minute |
| aim-bot #2 | 80% | server | extra shield <-> super hero | device 2 - player 2 | provide extra shield to player 2 for 40 seconds |
| see map | 50% | server | false info <-> prophet | server | provide a false map for 2 minutes |
| gain badges | 60% | human | data corruption <-> corrupt clerk | server | make player 1's badges unusable |
| burst communication | 100% | server | slow communication <-> cracker | server | slow data from player 1 for 40 seconds |

METHODS, DEVICES, AND SYSTEMS FOR COUNTERING CHEATS IN GAMES

TECHNICAL FIELD

The present disclosure relates generally to gaming systems and, more specifically, to countering cheats in a multi-player gaming environment.

BACKGROUND

In computer games, players sometimes cheat to gain unfair advantages. Counter measures in previously existing solutions are generally based on prevention or sanction after the fact. Prevention-based solutions work by making the game environment resistant to cheating. However, cheaters frequently explore flaws in computer systems to bypass prevention measures. So far, cheaters have the upper hand by coming up with new cheats on daily basis. Sanction-based solutions rely on cheating detection. Cheating detection can be costly. Further, cheaters can change identity and/or use new cheat methods to evade detection, e.g., going under the radar without being caught, thus avoiding sanctions. As such, hardening the gaming environment in previously existing prevention-based solutions and solely relying on detection in previously existing sanction-based approaches have been ineffective in deterring and countering cheats.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 2A-2D are diagrams illustrating distributed cheating detection and the application of counter cheats, in accordance with some embodiments;

FIG. 4 is a table illustrating exemplary classifications of cheat data and counter cheat data, in accordance with some embodiments;

FIG. 6 is a table illustrating exemplary counter cheat data, in accordance with some embodiments;

Figure 1:
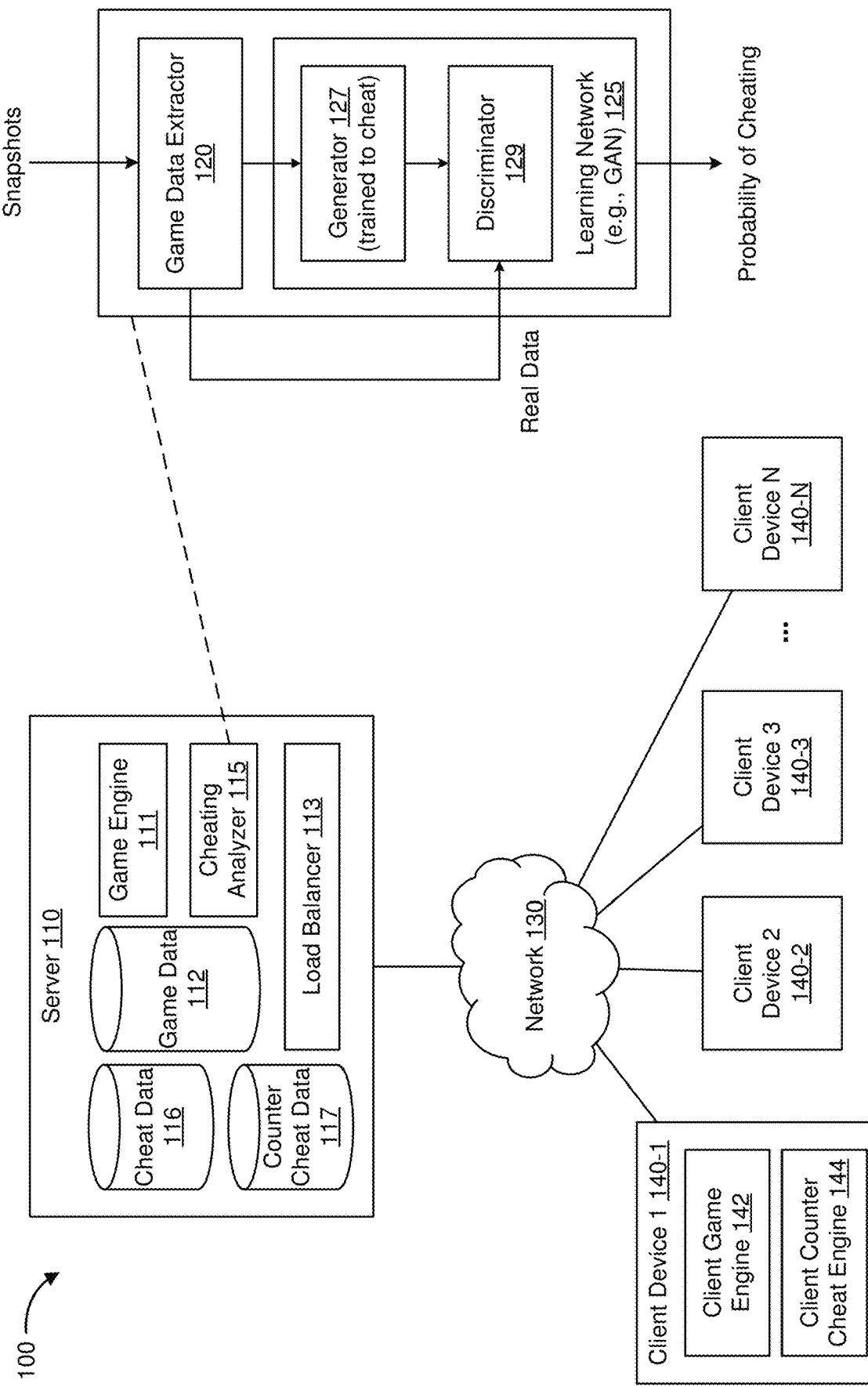
FIG. 1 is a block diagram of an exemplary multi-player gaming environment with distributed cheating detection and counter cheat engines, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, a system for countering cheats in a gaming environment includes a cheating analyzer coupled with a game engine. The cheating analyzer obtains and analyzes game data from the game engine (e.g., by continuously monitoring traffic and/or data to and from the game engine) to identify suspected cheating and applies adequate counter cheats in real-time. In some embodiments, based on the cheat data, the cheating analyzer determines a probability of the suspected cheating. The cheating analyzer then applies a similar cheat as a counter measure against the suspected cheater. For example, upon determining that there is a 50% chance that a suspicious cheater is using an aim-bot in a game to gain an upper hand against an innocent player, the cheating analyzer instructs the game engine to apply an aim-bot with 50% capacities against the suspicious cheater during the same game. The innocent player will not have to do anything, as the cheating analyzer instructs the game engine to apply the counter measure automatically on behalf of the innocent player to fight back the cheats.

In accordance with various embodiments, a counter cheating method is performed at a server that includes one or more processors and a non-transitory memory, where the server includes a cheating analyzer and the non-transitory memory stores cheat data and counter cheat data. The method includes identifying suspected cheating in a game. The method further includes determining a probability of the suspected cheating based on the cheat data. The method also includes selecting a counter cheat of the suspected cheating corresponding to the probability based on the cheat data and the counter cheat data. The method additionally includes applying the counter cheat approximate the probability in the game.

Example Embodiments

Methods, devices, and systems in accordance with various embodiments described herein utilize a server-side cheating analyzer to motivate fair play in a multi-player gaming environment. The cheating analyzer instructs a game engine in the gaming environment to automatically apply immediate and appropriate punishment for any cheating attempts without human intervention. In some embodiments, the cheating detection and the application of the counter cheats are distributed so that at multiple points in the game environment (e.g., on the server and/or on client devices) suspected cheating can be detected, probabilities of the suspected cheating can be calculated, and the counter measures can be activated at the point of detection for faster cheating detection and prevention. Further, in some embodiments, through continuous monitoring, new types of cheating and under-the-radar cheating can be detected, and when a new family of cheating is detected, new counter cheat(s) are designed and implemented in the gaming environment, thus allowing faster recovery from previously unknown types of cheating.

Reference is now made to FIG. 1, which is a block diagram of an exemplary multi-player gaming environment 100 with distributed cheating detection and counter cheat engines in accordance with some embodiments. In some embodiments, the multi-player gaming environment 100 includes a server 110 and a plurality of client devices 140 (e.g., client device 1 140-1, client device 2 140-2, client device 3 140-3, . . . , client device N 140-N, etc.) connected via a network 130. The network 130 includes any one or more of a variety of data communications networks, e.g., including wired, wireless, public, and/or private network portions. Although a single server 110 and a single network 130 are illustrated in FIG. 1, the gaming environment 100 can include one or more servers 110 as well as one or more networks 130. For the sake of simplicity, the subject matter will be described hereinafter for the most part with reference to a single server 110 and a single network 130. It will be appreciated that the components, devices or elements illustrated in and described with respect to FIG. 1 may not be mandatory and thus some may be omitted in certain embodiments. Additionally, some embodiments can include further or different components, devices or elements beyond those illustrated in and described with respect to FIG. 1.

In some embodiments, the server 110 includes a game engine 111 for providing gaming services to the plurality of client devices 140 and a load balancer 113 for balancing the network load and/or gaming application execution load in the multi-player gaming environment 100. In some embodiments, when multiple players at the plurality of client devices 140 access the gaming services provided by the game engine 111, the data exchanged among the server 110 and the plurality of client devices 140 via the network 130 are stored by the server 110 as the game data 112. The game data 112 include, for example, the player information from the plurality of client devices 140 (e.g., player identifiers, client device identifiers, games being played, etc.), network traffic data gathered by the load balancer 113 (e.g., the number of packets, the sizes of the packets, the transmission time/rate, the transmission direction, patterns of packet transmission, etc.), player actions in the games as reported by the game engine 111 (e.g., jump, kick, peer, attack, move, rotate, etc.), among others.

In some embodiments, the server 110 also includes a cheating analyzer 115 coupled to the game engine and the game data 112. In some embodiments, the server 110 additionally includes data stores for facilitating the application of counter cheats, such as a data store for cheat data 116 and a data store for counter cheat data 117. As used herein, the term "cheat" refers to something or an act that seems unfair or dishonest, for example, a way of doing something with less effort than it usually needs. In gaming, cheating often involves a video game player using various methods or committing acts to create an advantage beyond normal gameplay. Cheats can be activated from within the game itself (e.g., a cheat code implemented by the original game developers), or created by third-party software (e.g., a game trainer or debugger) or hardware (e.g., a cheat cartridge). Also as used herein, the term "counter cheat" (also used interchangeably with the terms "countermeasure") refers to acts or measurements of fighting cheats. Counter cheats have the effect of deterring and fighting cheats and encouraging fair play.

In some embodiments, the cheating analyzer 115 analyzes the game data 112 and identifies suspected cheating, and derives the cheat data 116 from the game data 112. For example, upon analyzing the network traffic associated with a game, the cheating analyzer 115 detects an anomaly in the network traffic originating from a respective client device 140 that is used by a player, e.g., a burst in the amount of packets and/or the sizes of the packets. In response to detecting the anomaly, the cheating analyzer 115 extracting information from the game data and storing in the cheat data information such as a player identifier of the player, a device identifier of the respective client device, a detector identifier (e.g., detected by a human, the server 110, and/or another client device 140), and the acts of cheating associated with the suspected cheat, e.g., moved 5 units in 2 seconds, saw through transparent walls, used an aim-bot, and/or generated burst communication, etc.

In some embodiments, the cheating analyzer 115 further determines a probability of suspected cheating, obtains the appropriate counter measure from the counter cheat data 117, and instructs the game engine 111 to apply the counter measure corresponding to the probability value. To determine the probability of the suspected cheating, in some embodiments, as shown in FIG. 1, the cheating analyzer 115 includes a game data extractor 120 and a learning network 125 for determining the probability of the suspected cheating. In some embodiments, the game engine 111 periodically takes a snapshot of a game, e.g., once per second. Within each time period, the game engine 111 provides the snapshot to the cheating analyzer 115. Upon receiving the snapshot within each time period, in some embodiments, the game data extractor 120 derives a vector description from the snapshot. Attributes of the vector description include the history information about the players, the information about each object in the game (e.g., location, status, etc.), the information about communication characteristics, and/or the information about events that took place in the last time period, etc. For example, the information about communication characteristics can include the number of incoming and outgoing packets, packet sizes, the transmission time and direction, and/or bursts in the traffic pattern, etc. In some embodiments, the cheating analyzer 115 stores the attributes in a feature vector $p(n)$. In the next time period, the cheating analyzer generates a new feature vector $p(n+1)$. The cheating analyzer 115 then predicts the probability of $p(n+1)$ being a successor of $p(n)$ without any known cheat. In some embodiments, the cheating analyzer 115 stores the vectors, the attributes, and/or the probability in the cheat data store 116 and/or the counter cheat data store 117.

In some embodiments, the learning network 125 is a Generative Adversarial Network (GAN). In the GAN, two neural networks can be trained that compete against each other in a game, e.g., the learning network 125 further includes a generator 127 (e.g., a generative neural network) and a discriminator 129 (e.g., a discriminative neural network). The generator 127 is trained to cheat and generate cheats, and the discriminator 129 is trained to detect the cheats, e.g., to discriminate the real data from the cheats. In some embodiments, the discriminator 129 then solves a binary classification problem to generate the probability P of the suspected cheating as the output, e.g., using a sigmoid function to produce the output in the range 0 to 1. In some embodiments, the discriminator 129 is trained through backpropagation to minimize the error of discriminating the generated cheats from the real data. Over time, the discriminator 129 becomes better at detecting the cheats. It should be noted that GAN is one example of the learning network 125. Other learning networks, including, but not limited to supervised learning, unsupervised learning, and/or multilayer deep learning networks, can be used in place of or in conjunction with GAN.

On the client side, a respective client device 140, e.g., a computer, a mobile device, a game console, and/or a set-top-box, etc., connects to the server 110 and/or other client device(s) 140 via the network 130 so that a respective user of the client device 140 can participate in games. In some embodiments, the server 110 deploys local copies of the cheating analyzer 115 and/or the game engine 111 to the plurality of the client devices 140. In such embodiments, an exemplary client device 140, such as client device 1 140-1, includes a client game engine 142 for running an instance of the game engine 111 and a client counter cheat engine 144 for running a version (or a simplified version) of the cheating analyzer 115. For example, the server 110 can send parameters (or a subset of the parameters) of the learning network 125 to the client device 140, so that the client counter cheat engine 144 can determine the probability of suspected cheating locally. Further in some embodiments, the server 110 sends and updates at least a portion of the cheat data 116 (e.g., classifications of the acts of cheating and/or a newly discovered previously unknown act of cheating) and/or the counter cheat data 117 (e.g., the assignments of counter cheats for various counter cheat types, etc.) to the client device 140. The subset of the cheat data 116 and/or the counter cheat data 117 are used by the client counter cheat engine 144 for local cheating detection and/or counter cheat selection in accordance with some embodiments.

In some embodiments, the client game engine 142 in multi-player games reports the game data via the network 130 to the server 110 and/or to other game participants (also referred to as "players"), e.g., by broadcasting information such as position, velocity, heading, angular velocity, actions (e.g., jump, kick, peer, attack, move, rotate), time, etc. for each character or object in a game the player interacts with. The server 110 and/or other game participants at the client devices 140 use such information to update the position and activities of other characters and objects in the game. In the gaming environment 100, the detection of suspected cheating, the determination of the probability of the suspected cheating, the selection of the counter cheat, and/or the application of the counter cheat are distributed in accordance with various embodiments. For instance, the client game engine 142 can report locally collected game data to the server 110 for analysis, and the client counter cheat engine 144 can receive instructions from the server 110 to apply the counter cheat. By deploying multiple instances of the game engine 111 and/or the cheating analyzer 115 in the gaming environment 100, cheating detection and counter cheat application are distributed, thus improving the detection efficiency and the accuracy of counter cheats.

It should be noted that one or more components and/or functions of the server 110 and/or the client device 140 may be distributed and/or re-arranged. For example, the cheating analyzer 115 can be on a different and distinct server from the server hosting the game engine 111. As such, the server 110 and/or the client device 140 in the exemplary gaming environment 100 can include more, less, and/or different elements than shown in FIG. 1. Each of the components in the exemplary gaming environment 100 can include appropriate hardware, software, and/or firmware to perform the operations attributed to the element herein. Operation(s) attributed to an element in the gaming environment 100 herein should not be considered binding and in some embodiments, other element(s) in the exemplary gaming environment 100 may additionally or alternatively perform such operation(s).

Figure 2D:
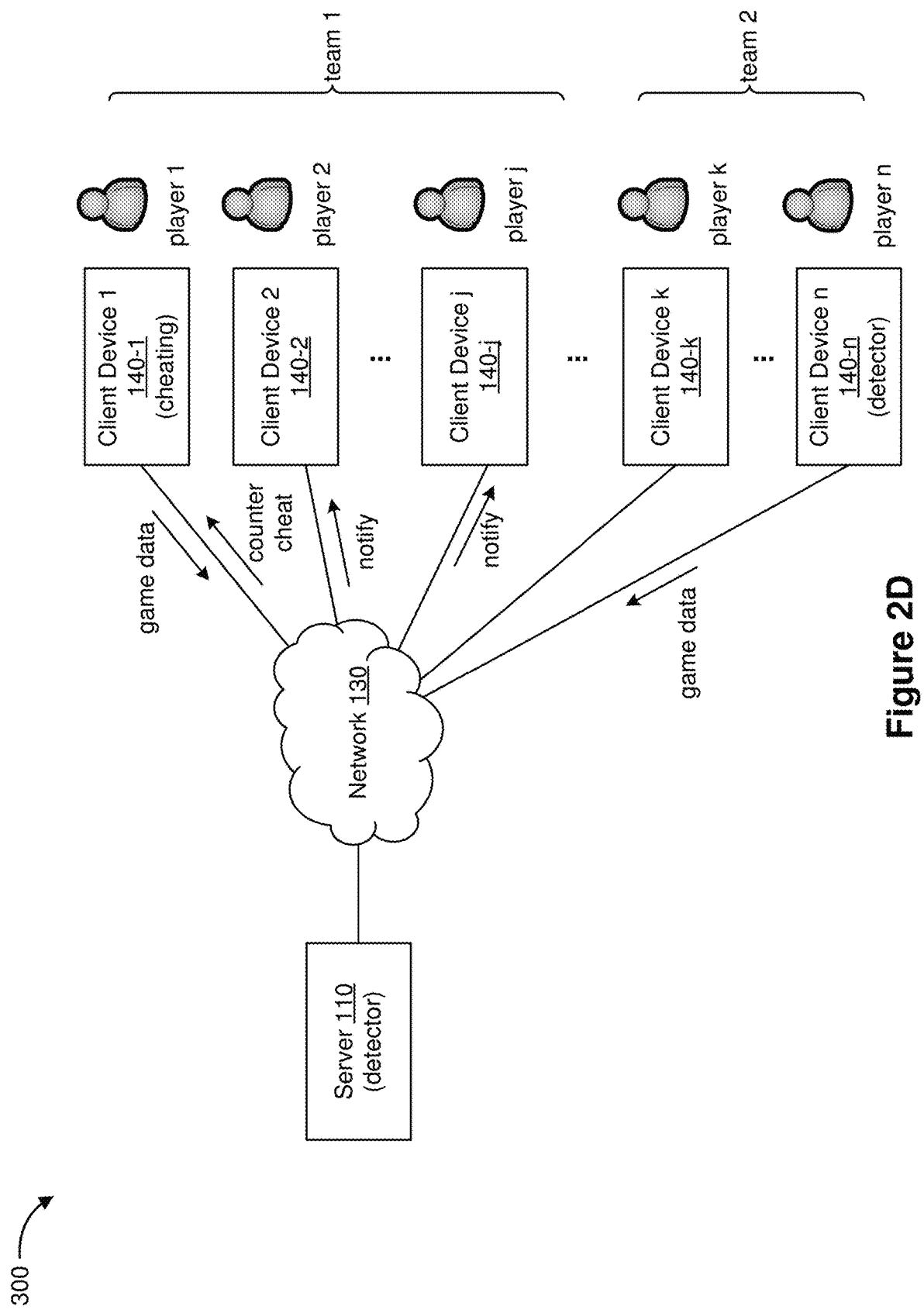

FIGS. 2A-2D illustrates various examples 200A-200D of distributed cheating detection and the application of counter cheats. In FIG. 2A, when player 1 at client device 1 140-1 attempts to cheat in a game, the server 110 collects the game data and the cheating analyzer at the server 110 identifies suspected cheating in the game data and determines the probability of the suspected cheating, e.g., the server 110 being the detector. In some embodiments, upon determining that the probability exceeds a threshold, when delivering updated game data to client device 1 140-1, the server 110 sends along counter cheat(s) to be applied by the client game engine on client device 1 140-1. For instance, when player 1 attempts to cheat by seeing the moves of player 2 through transparent walls, the game data sent by the server 110 instruct the client game engine on client device 1 140-1 to fog the view for player 1 for a period of time. In other words, upon identifying the suspected cheating originating from client device 1 140-1 used by player 1, the server 110 applies the counter cheat by reducing capabilities of player 1.

In FIG. 2B, when player 1 at client device 1 140-1 attempts to cheat in a game, similar to the embodiments in FIG. 2A, the server 110 collects the game data and the cheating analyzer at the server 110 identifies suspected cheating in the game data and determines the probability of the suspected cheating, e.g., the server 110 being the detector. Different from the embodiments in FIG. 2A, in some embodiments, upon determining that the probability exceeds a threshold, when delivering updated game data to client device 1 140-1, the server 110 sends along counter cheat(s) to be applied by the client game engine on client device 2 140-2. For instance, when player 1 attempts to cheat by gaining extra speed, the game data sent by the server 110 instruct the client game engine on client device 2 140-2 to give extra speed to player 2 for a given time or displaying a symbol on the screen to play 2 that informs player 2 of the super power for a given time. In other words, upon identifying the suspected cheating by player 1 at client device 1 140-1 towards the innocent player 2 at client device 2 140-2, the server 110 applies the counter cheat by enhancing capabilities of player 2.

In FIG. 2C, when player 1 at client device 1 140-1 attempts to cheat in a game, different from the embodiments of server-side detection shown in FIGS. 2A and 2B, the client game engine and/or the client counter cheating analyzer on client device 2 140-2 identify suspected cheating in the game data obtained by client device 2 140-2, e.g., client device 2 140-2 being the detector. For example, player 1 and player 2 may be in a game playing against each other and client device 1 140-1 and client device 2 140-2 are connected via the network 130 to exchange game data, e.g., via a peer-to-peer connection or in an online game hosted by the server 110. In some embodiments, with the permission from the server 110, the client counter cheat engine generates counter cheat(s) locally on client device 2 140-2 and sends the counter cheats to client device 1 140-1 via the network 130. As such, the gaming environment disclosed herein allows the application of counter cheats at the point of cheating detection. In some embodiments, instead of or in addition to generating the counter cheats locally, client device 2 140-2 sends the game data to the server 110 for further analysis, and the counter cheat is selected by the server 110 and sent to client device 1 140-1 to counter the cheat by player 1.

In some embodiments, the game provided by the game engine on the server 110 is a massively multi-player online game (MMOG or MMO) with large numbers of players, e.g., often hundreds or thousands on the same server. MMOGs can enable players to cooperate and compete with each other on a large scale, and sometimes to interact with people around the world. In FIG. 2D, the server 110 hosts a MMOG and the players cooperate and form teams, clans, and/or tribes to compete, e.g., player 1, player 2, . . . , player j in team 1 to compete against player k, . . . , player n in team 2. In some embodiments, when player 1 at client device 1 140-1 in team 1 attempts to cheat in the MMOG, the server 110 obtains the game data from client device 1 140-1 and identifies suspected cheating in the game data. In some embodiments, instead of or in addition to detecting the suspected cheating at the server 110, e.g., the server 110 and/or the client device n 140-n being the detector(s), the client game engine and/or the client counter cheat engine can report the suspected cheating in the MMOG, e.g., client device n 140-n detecting the suspected cheating by player 1 on client device 1 140-1 and reporting the suspected cheating along with the game data to the server 110 for further analysis. In some embodiments, in addition to applying counter cheat measures to counter the suspected cheating on client device 1 140-1 against player 1, when the probability of the suspected cheating satisfies a criterion (e.g., with more than 50% certainty), the server 110 also notifies other members of team 1 of the detected cheat and/or the counter measure since the penalty of cheating by one member in the team potentially affects the whole team, e.g., other members may vote to remove the cheater from their team.

Figure 3:
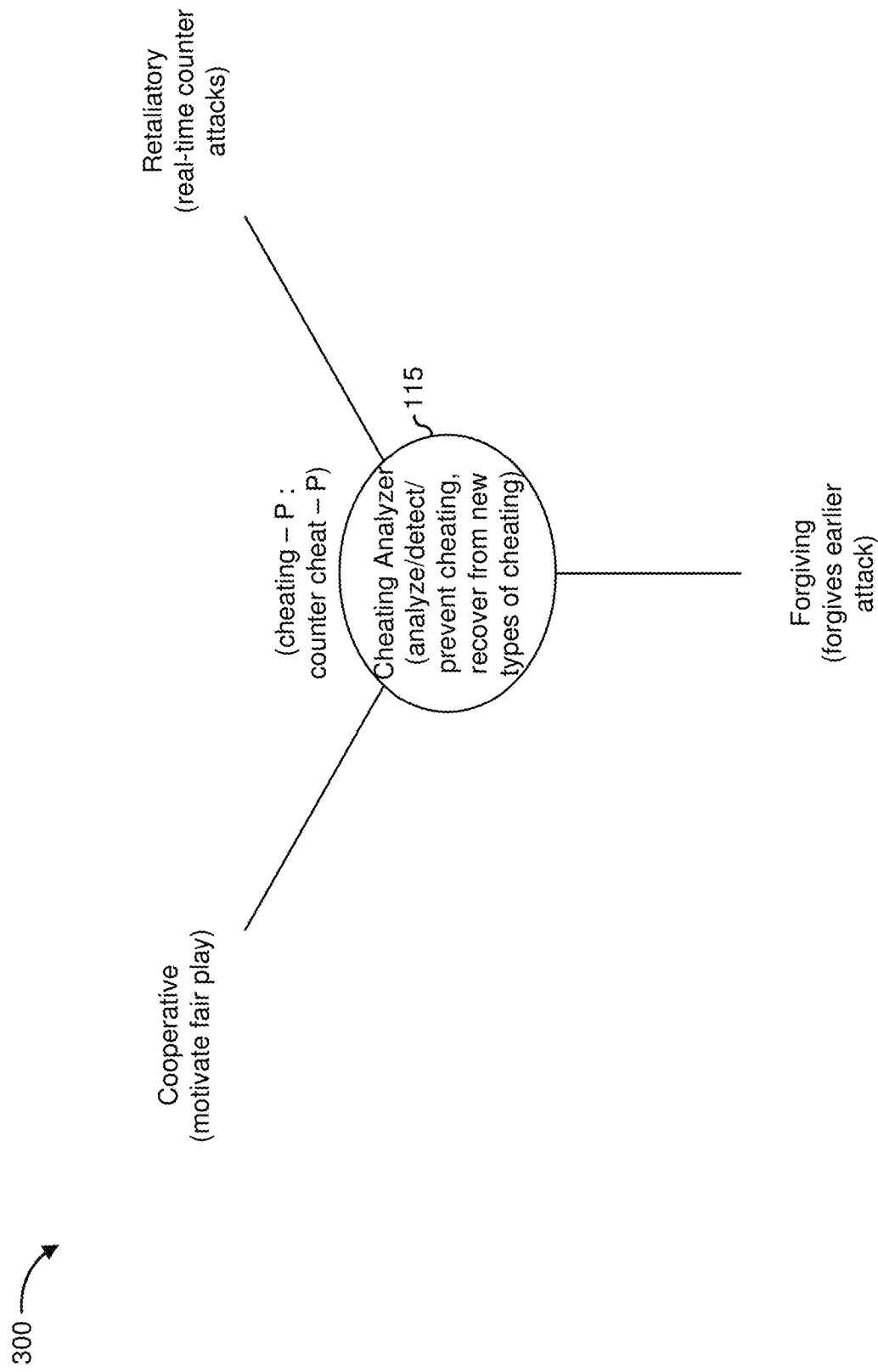
FIG. 3 is a diagram illustrating an exemplary counter cheating policy, in accordance with some embodiments.

FIG. 3 is a diagram 300 illustrating an exemplary counter cheating policy in accordance with some embodiments. In some embodiments, the counter cheating method shown in FIG. 3 is embedded in the cheating analyzer 115 (FIG. 1) and/or the local copies of the cheating analyzer (e.g., the client counter cheat engine 144, FIG. 1). Further, in some embodiments, the execution of the counter cheating method is facilitated by the game engine 111 (FIG. 1) and/or the client game engine 142 (FIG. 1). In some embodiments, the gaming environment 100 (FIG. 1) applies a tit-for-tat policy for assigning fair counter cheats. In game theory, tit-for-tat is also referred to as the prisoner's dilemma strategy. It is a type of a non-zero-sum game in which players may each cooperate with or defect (e.g., betray, cheat, and/or attack) the other player. A gaming environment implementing the tit-for-tat policy can encourage honest behaviors by forgiving earlier attacks and allowing a greater reward to each player if they play honestly.

To apply a tit-for-tat policy, the cheating analyzer 115 continuously analyzes, detects, and prevents cheating, and recovers from new types of cheating. Using the counter cheating method in accordance with some embodiments, the gaming environment motivates fair play by encouraging honest behaviors among innocent players and is forgiving of the suspected cheaters once the cheating stops. On the other hand, when the cheating analyzer 115 detects suspected cheating in real-time with probability P, the cheating analyzer 115 applies a similar cheat with probability P against the suspected cheater in real-time, e.g., applying the retaliatory counter attacks in real-time. For example, when there is a 50% chance that the suspected cheater is using an aim-bot, the cheating analyzer 115 instructs the game engine to apply an aim-bot with the similar capabilities (e.g., an aim-bot with 50% capacity) against the suspected cheater during the same game. Further, as will be described in further detail below, in some embodiments, the cheating analyzer 115 classifies the cheat data based on personas representing motives to cheat and applies the tit-for-tat policy to assign counter cheats that directly counter the motives associated with the personas. As such, using the counter cheating method described herein in accordance with various embodiments, the gaming environment effectively and automatically counter attacks cheaters without burdening the innocent players and applies the fair amount of counter cheats to motivate fair play and honest behaviors.

FIG. 4 is a table 400 illustrating exemplary classifications of cheat data and counter cheat data in accordance with some embodiments. Various cheating motives can occur during execution of a game application. As explained above with reference to FIGS. 1 and 2A-2D, instances of the learning network on the server and/or the client devices can determine the probability of the suspected cheating, and the cheating analyzer and local copies of the cheating analyzer on the server and/or on the client device(s) can derive the cheat data from the game data. In some embodiments, the cheating analyzer further classifies various acts of cheating based on different personas representing various cheating motives and assigns counter cheats that directly attack the cheating motives. In some embodiments, the cheating analyzer stores the classification in the cheat data 116 (FIG. 1) and/or the counter cheat data 117 (FIG. 1).

For example, the exemplary table 400 includes four columns 410-440. The first column 410 identifies the persona representing the cheating motives, which is identified in the second column 420. The third column 430 identifies potential acts of cheating committed by the persona. For example, the super hero persona has the motive of gaining super power to help winning the game. As such, the cheater with the super hero persona has superior speed, vision, capabilities, such as walking on water and/or being a super sniper, etc. In another example, the prophet persona has the motive of wanting to know the future and seeing everything. As such, the cheater with the prophet persona may cheat by obtaining a map of the game before everybody else and/or knowing about secret moves of his opponent, etc. In yet another example, the corrupt clerk persona has the motive of changing the game data, whether their own data or the opponent's data. As such, the cheater with the corrupt clerk persona may obtain badges and/or game money through illegitimate means or advance by changing the opponent's data, e.g., by reducing the opponent's ranking, etc. In still another example, the cracker persona has the motive of destroying the other's work and/or achievements. As such, the cheater with the cracker persona may initiate network attacks to interfere or slow down the opponent's communication.

In some embodiments, the cheating analyzer addresses the motives by designing various types of counter cheat(s) as shown in the fourth column 440 to directly counter the alter ego of the persona. For example, counter cheat types such as impairing the character's vision, crippling, shaking, and/or showing the sniper's hand diminish the super power of the super hero persona. In another example, counter cheat types such as providing to cheater false information and/or view counters the prophet persona's knowing or seeing everything ahead of everyone else. In yet other examples, corrupting the cheater's data to make the cheater's data unsafe and/or unstable counters the motive of data manipulation by the corrupt clerk persona; and creating force majeure to destroy the cheater's assets demotivates the cracker persona's motive of being destructive.

Figure 5:
FIG. 5 is a table illustrating exemplary cheat data, in accordance with some embodiments.

FIG. 5 is a table 500 illustrating exemplary cheat data 116 (FIG. 1) in accordance with some embodiments. In some embodiments, the cheating analyzer derives information such as the player identifier, the game being played, the persona, the act of suspected cheating, and/or the probability of the suspected cheating, etc., and stores such information in the cheat data. The first column 510 identifies the player identifier associated with the player who is suspected of cheating. The second column 520 identifies the game being played when the suspect cheating takes place. Such information can be used by the gaming environment to assign counter cheats and/or to notify other players playing the same game. In the exemplary table 500, the third column 530 identifies the persona representing the cheating motive for the act of cheating identified in the fourth column 540. As described above with reference to FIG. 1, the cheating analyzer also determines a probability of the suspected cheating. As such, the cheating analyzer records the probability of the suspected cheating in the fifth column 550.

For example, cross referencing the information shown in FIG. 4, as represented by the first row, the cheating analyzer determines that there is a 70% chance that player 1, while playing game A, wants to be a super hero, e.g., gaining super power to win. With the super power, player 1 takes cheating actions such as moving too fast (or walking on water and/or seeing in the dark, etc.). In another example of the cheater wanting to be a super hero, as represented by the third row and the fourth row, the cheating analyzer determines that while playing game B, there is a 40% chance that player 3 cheats using an aim-bot and there is an 80% chance that player 4 cheats using another aim-bot. Other examples such as player 2 wanting to be a prophet, player 5 wanting to be a cracker to destroy other people's work or network, or player 6 wanting to be a corrupt clerk to be able to change the data, etc. as shown in the second, the fifth, and the sixth row respectively. For each cheating action, the cheating analyzer determines a probability of the suspected cheating, e.g., 90% chance of player 2 seeing through transparent walls when playing game A, 100% chance of player 5 generated burst communications to overwhelm the network when playing game C, or 50% chance of player 6 gained extra badges and money when playing game C, etc.

Base the player information, the game being played, the persona, the act of the suspected cheating, and/or the probability of the suspected cheating, etc., the cheat analyzer can choose to apply different types of counter cheats. For example, in FIGS. 2A and 2B, when the server 110 is the detector for detecting the suspected cheating at client device 1 140-1, the server 110 can selects different counter cheats, such as reducing the capabilities of player 1 (e.g., the cheater) as shown in FIG. 2A or enhancing the capabilities of player 2 (e.g., the innocent player) as shown in FIG. 2B.

FIG. 6 is a table 600 illustrating exemplary counter cheat data 117 (FIG. 1) in accordance with some embodiments. In some embodiments, the cheating analyzer cross references the cheat data as shown in FIG. 5 and/or the classifications as shown in FIG. 4 and assigns counter cheats for various cheating acts directed at the motives and/or personas associated with the cheating acts. The first column 610 identifies the cheat data, such as the act(s) of cheating by player 1 at client device 1, etc. The second column 620 records the probability of the suspected cheating by the respective player at the respective client device as determined by the cheating analyzer. In some embodiments, the cheating analyzer also records in the third column 630 whether the cheat is detected by the server, the client device, and/or by a human (e.g., a judge that decides if suspected cheating actually took place or not). Recording the source of the cheating detection allows the cheating analyzer to decide where to apply the counter cheat(s) as recorded in the fifth column 650. In some embodiments, the cheating analyzer classifies the counter cheat type in the fourth column 640 where the counter cheat type counters the persona and/or the motive of the suspected cheating. In some embodiments, the cheating analyzer cross references the classifications as shown in FIG. 4, e.g., based on the counter cheat type, and selects and specifies the counter cheat in the sixth column 660.

For example, upon a human identifying that there is a 70% chance that player 1 at client device 1 cheated by attempting to move too fast, e.g., moving 5 units in 2 seconds, the cheating analyzer cross references the counter cheat classification and the cheat data as shown in FIGS. 4 and 5 to assign the counter cheat type "extra speed" to counter the super hero persona with the motive of gaining super power to help winning over player 2 at client device 2. Further, the cheating analyzer determines that since player 1 at client device 1 attempted the suspected cheat, the counter cheat of granting extra speed would be applied by player 2 at client device 2, e.g., by allowing player 2 extra speed for a given time. In some embodiments, since the probability of the suspected cheating is 70%, the cheating analyzer instructs the game engine to give player 2 at client device 2 extra speed for a duration of 70% of the given time, e.g., enhancing the capabilities of player 2 by a percentage that is equivalent to the value of the probability. Alternatively, the cheating analyzer instructs the game engine to give player 2 at client device 2 70% of the extra speed for the given time.

Other examples of counter cheats countering the super hero persona gaining super power motive include counter types "fog", "malfunction-aim-bot", and "extra shield", e.g., fogging the super vision of the super hero persona, another aim-bot countering the super shooting capability of the super hero persona, and/or tamper proof the shield to resist the super power, etc. In the case of the counter cheats countering the prophet persona, the corrupt clerk persona, or the cracker persona, the cheating analyzer creates counter types "false information", "data corruption", and "slow communication" respectively to counter the motives of the respective persona. In some embodiments, according to the counter cheat type in the fourth column 640 and based on the cheat data in the first column 610 and the point of detection in the third column 630, the cheating analyzer assigns the server or client device(s) for applying the counter cheat. For example, the cheating analyzer selects the server for applying the counter cheat of fogging the super vision of player 1 at client device 1 or selects client device 2 used by player 2 for receiving a super weapon or the extra shield. In another example, the cheating analyzer selects the server for applying the counter cheats of displaying a false map, making a portion of player 1's badges unusable, or slowing the data from player 1 such as lower the priority of packets received by the cheater.

In some embodiments, based on the probability of the suspected cheating recorded in the second column 620, the cheating analyzer instructs the game engine to apply the counter cheat with the capacity approximate or corresponding to the value of the probability of the suspected cheating. For example, having selected fogging the view for player 1 at client device 1 for 30 seconds as the counter cheat and based on the probability value of 90%, the cheating analyzer instructs the game engine to fog the view for player 1 for 27 seconds (e.g., 90% of 30 seconds) and/or reducing the opacity of the transparent walls by 90% for 30 seconds for player 1, e.g., reducing the capabilities of player 1 by a percentage that is equivalent to the value of the probability. In another example, the having selected enhancing player 2's weapon at client device 2 for 1 minute and based on the probability value of 40%, the cheating analyzer instructs the game engine to enhance player 2's weapon for 24 seconds (e.g., 40% of 1 minute) and/or increasing player 2's weapon power and/or accuracy by 40%. Likewise, when providing the extra shield to player 2 at client device 2, the cheating analyzer can instruct the game engine to make the extra shield available for 32 seconds (e.g., 80% of 40 seconds). In yet another example, the cheating analyzer can provide a false map to player 1 for 1 minute (e.g., 50% of 2 minutes), make 60% of player 1's badges unusable, or slow the data from player 1 at device 1 for 40 seconds (e.g., 100% of 40 seconds).

The exemplary information stored in the data stores as shown in FIGS. 4-6 are illustrative and not exhaustive. Other information for facilitating cheat detection and/or countering cheats may be obtained and stored in place of or in combination with the columns shown in FIGS. 4-6. Further, the counter cheat system described herein in accordance with various embodiments can randomize the selection of the counter cheat actions, according to policy, and/or vary over time to fight back cheating while encouraging honest behaviors in the gaming environment.

Figure 7:
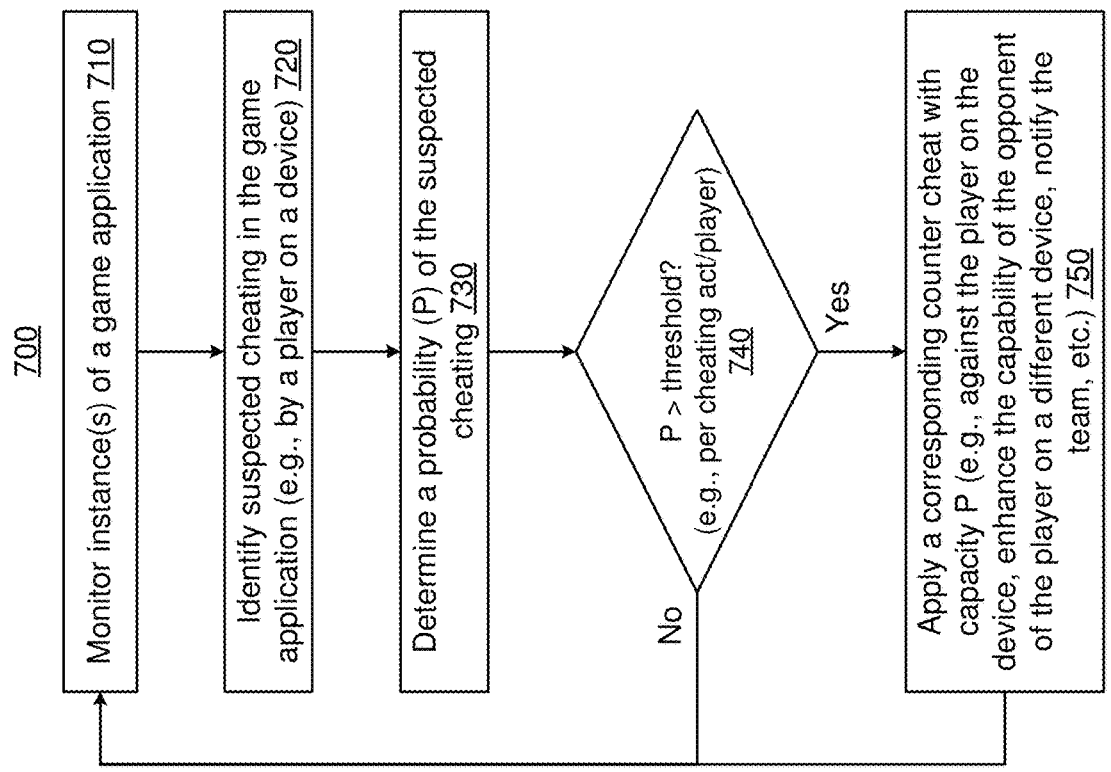
FIG. 7 is a flow diagram illustrating a counter cheating method, in accordance with some embodiments.

FIG. 7 is a flow diagram illustrating a counter cheating method 700 in accordance with some embodiments. As represented by blocks 710 and 720, the method 700 begins with monitoring instance(s) of a game application and detects suspected cheating in the game application. In some embodiments, the monitoring and the detecting are performed by the server, e.g., by the cheating analyzer 115 coupled to the game engine and/or the load balancer 113 on the server 110 as shown in FIG. 1. In some embodiments, the monitoring and the detecting are performed by the client, e.g., by the client game engine 142 on a respective client device 140 as shown in FIG. 1. In some embodiments, the cheating analyzer on the service side and the client game engine coordinate and continuously monitor the instance(s) of the game application in order to detect any suspected cheat, e.g., the client game engine also reports the detected suspected cheat to the server as part of the game data. Through continuous monitoring, when a player uses a device for a suspected act of cheating in the game, the cheating analyzer is able to obtain from the game data information such as the player identifier, the device identifier, and/or the suspected act of cheating, etc. as the cheat data.

As represented by block 730, the cheating analyzer analyzes the cheat data and determines a probability P of the suspected act of cheating. Various methods can be used for cheating detection and the determination of the probability of the suspected cheating. For example, FIG. 1 illustrates using the learning network 125 for determining the probability of the suspected act of cheating. Other methods, e.g., supervised, non-supervised, and/or analytics, etc., can be used in place of or in combination with the learning network 125 shown in FIG. 1 for cheating detection and the determination of the probability of the suspected act of cheating.

As represented by decision block 740, in some embodiments, the cheating analyzer determines whether the probability P satisfies a threshold. In some embodiments, the threshold is dynamic configurable, and/or randomized in some cases. For example, an administrator can adjust the threshold to require a lesser or higher degree of certainty regarding cheating before applying the counter cheat. In some embodiments, the threshold is configured for a respective act of cheating and for a respective player at a respective client device. Further, in some embodiments, even for the same suspected act of cheating, the same respective player and the same respective client device, the system uses more than one threshold for determining the suspected cheat and/or for determining whether to apply counter cheats. For instance, the system described herein can use one threshold with a higher value and another threshold with a lower value. When the percentage of the suspected cheating exceeds the higher value, e.g., indicating a clear evidence of cheating, the system immediately applies counter measure(s). On the other hand, when the percentage of the suspected cheating exceeds the lower value but does not exceed the higher value, the system can perform further analysis and apply counter measures later upon gathering sufficient game data and/or cheat data.

As represented by block 750, in some embodiments, upon determining that the probability satisfies the threshold ("Yes"-branch from decision block 740), the cheating analyzer directs the game engine (and/or facilitated by the client game engine) to apply a corresponding counter cheat with capacity value of P and the method 700 returns to the monitoring as represented by block 710. For example, as described with reference to FIG. 6 above, when applying the selected counter cheat, the capacity approximately corresponds to the value the probability of the act of cheating. Otherwise ("No"-branch from decision block 740), the method 700 returns to the monitoring as represented by block 710. In other words, if the probability is below the threshold (e.g., 30%), then nothing is done. On the other hand, if the probability is above the threshold, then the system activates the counter cheat with the probability value P (or approximate the probability value P). As such, apply the tit-for-tat strategy, the attacking back is fair and the cheater suffers what they did and not more.

Figure 8:
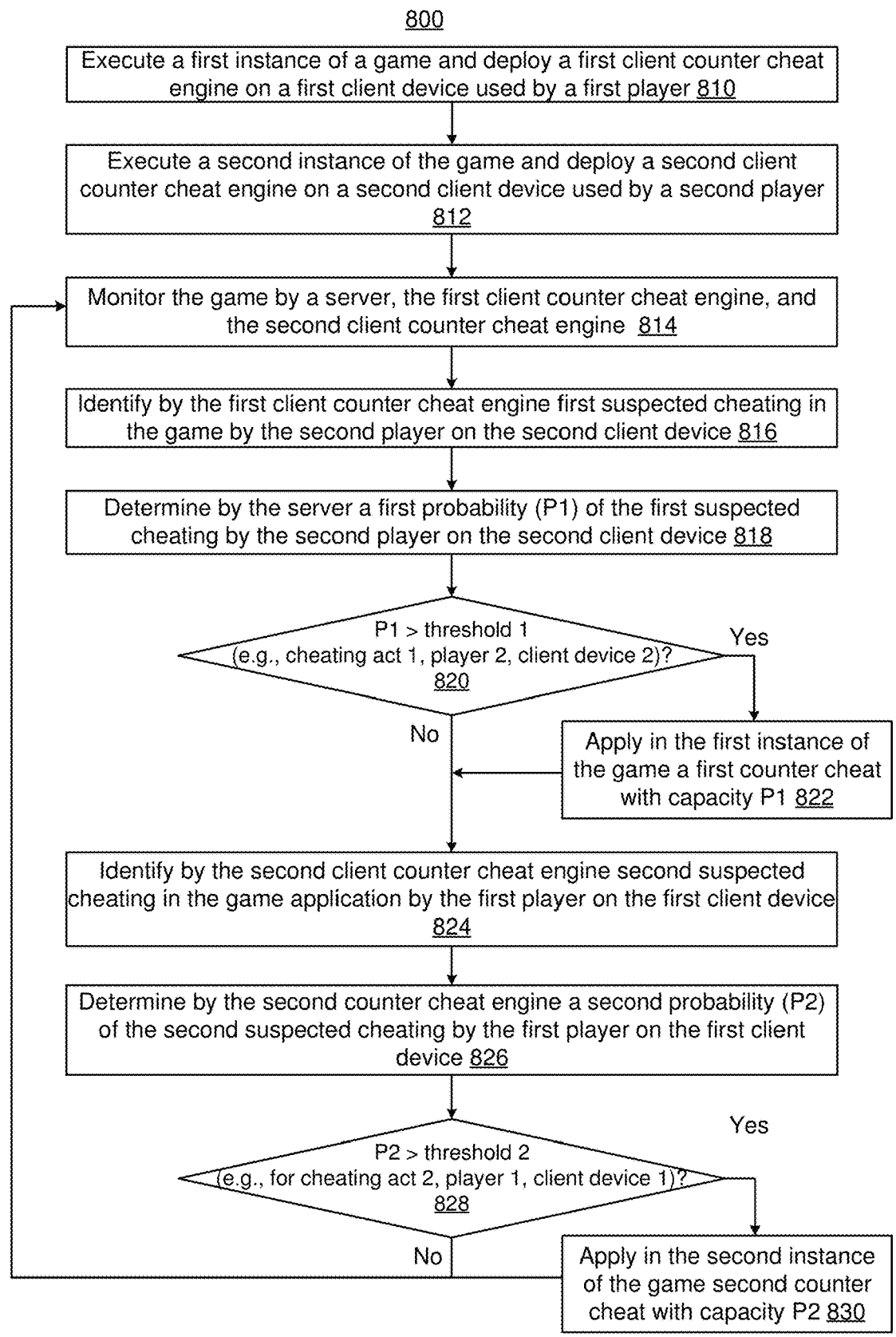
FIG. 8 is a flow diagram illustrating another counter cheating method, in accordance with some embodiments.

FIG. 8 is a flow diagram illustrating a counter cheating method 800 with distributed cheat monitoring, analysis, and countering in accordance with some embodiments. As represented by blocks 810 and 812, the method 800 begins with executing a first instance of a game and deploying a first client counter cheat engine on a first client device used by a first player as well as executing a second instance of the game and deploying a second client counter cheat engine on a second client device used by a second player. For example, as shown in FIG. 1, in addition to the game engine 111 and the cheating analyzer 115 on the server 110, a respective client device 140 can have a client game engine 142 for executing an instance of a game and a local copy of the client counter cheat engine 144 for monitoring cheating and countering cheating.

As represented by block 814, the game is monitored by a server (e.g., the cheating analyzer 111 in FIG. 1), the first client counter cheat engine, and the second client counter cheat engine. In some embodiments, the local copy of the client counter cheat engine utilizes the game data collected by the client game engine for cheating detection. For example, as represented by block 816, the first client counter cheat engine identifies first suspected cheating in the game by the second player on the second client device. In some embodiments, the client counter cheat engine sends the cheat data to the server so that the server (e.g., the cheating analyzer 115, FIG. 1) determines a first probability (P1) of the first suspected cheating by the second player on the second client device, as represented by block 818. Further, in some embodiments, as represented by decision block 820, the server (e.g., the cheating analyzer 115, FIG. 1) determines whether the first probability P1 satisfies a first threshold, e.g., a first threshold configured for a first act of cheating (or a first cheating motive) for the second player at the second client device.

In the case of the server determining that the first probability of the first suspected cheating P1 satisfies the first threshold ("Yes"-branch from decision block 820), the server instructs the first device (e.g., the cheating analyzer 115 on the server 110 instructing the client counter cheat engine 144, FIG. 1) to apply in the first instance of the game a first counter cheat (e.g., selected by the server according to the method described above with reference to FIGS. 4-6) with capacity value of P1 (or approximate to the value of P1) via the client game engine, as represented by block 822.

On the other hand, in the case of the server determining that the first probability of the first suspected cheating P1 does not satisfy the first threshold ("No"-branch from decision block 820), the method 800 continues with the second client counter cheat engine identifying second suspected cheating in the game application by the first player on the first client device, as represented by block 824. In some embodiments, as represented by block 826, instead of sending the cheat data to the server for further analysis, the second client counter cheat engine determines a second probability (P2) of the second suspected cheating by the first player on the first client device, as represented by block 826. Further, in some embodiments, as represented by decision block 828, the second client device (e.g., the client counter cheat engine 144, FIG. 1) determines whether the second probability P2 satisfies a second threshold, e.g., a second threshold configured for a second act of cheating (or a second cheating motive) for the first player at the first client device.

In the case of the second client device determining that the probability of the second suspected cheating P2 satisfies the second threshold ("Yes"-branch from decision block 828), the second device (e.g., with the permission from the server 110, FIG. 1) applies in the second instance of the game a second counter cheat (e.g., selected by the client counter cheat engine using local copies of the cheat data and counter cheat data according to the method described above with reference to FIGS. 4-6) with capacity value of P2 (or approximate the value of P2) via the client game engine, as represented by block 830. On the other hand, in the case of the second client device determining that the second probability of the second suspected cheating P2 does not satisfy the second threshold ("No"-branch from decision block 828), the method 800 returns back to the distributed monitoring as represented by block 814.

Figure 9:
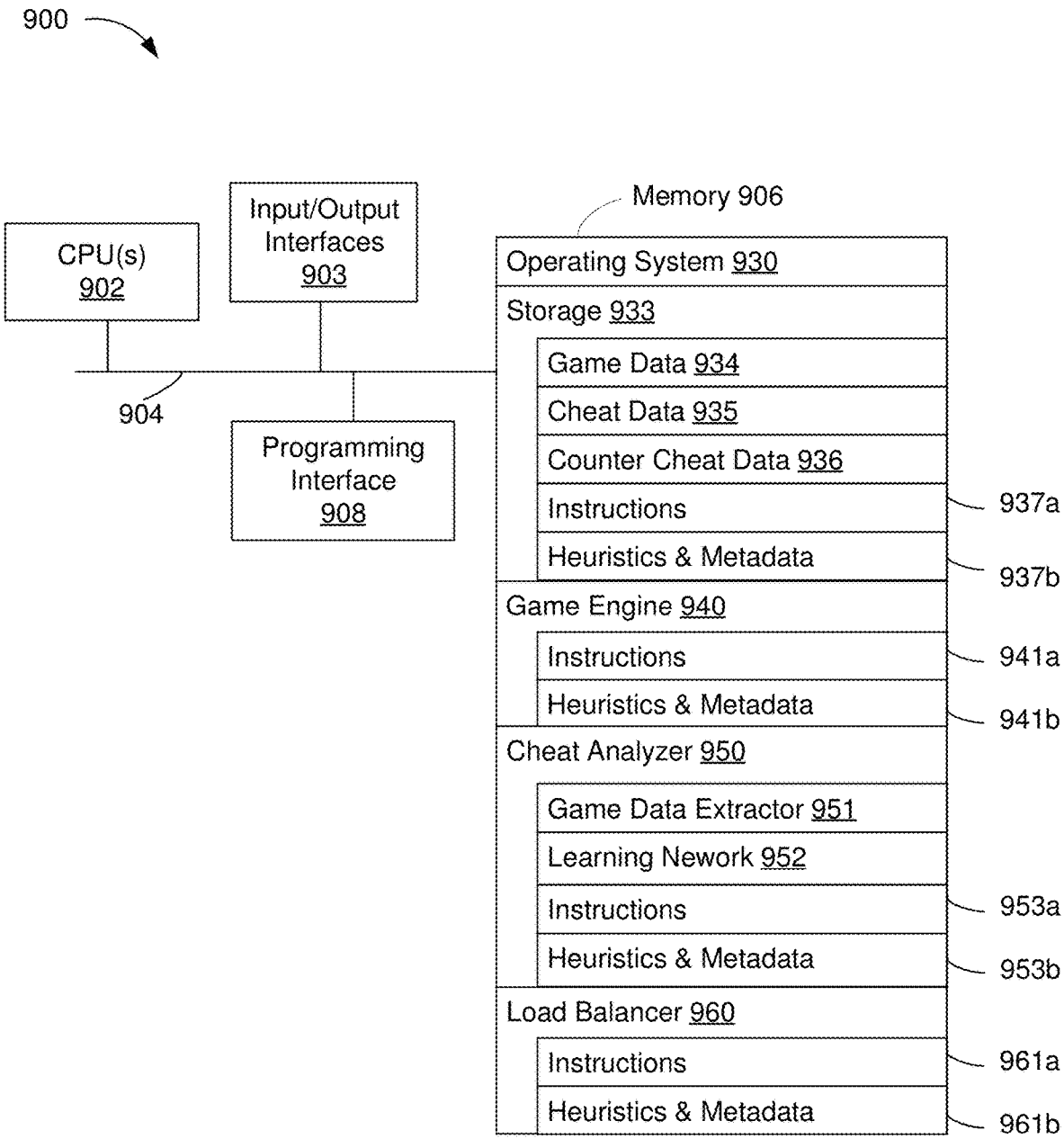
FIG. 9 is a block diagram of a computing device for countering cheating in games, in accordance with some embodiments.

FIG. 9 is a block diagram of a computing device 900 for countering cheating in games in accordance with some embodiments. In some embodiments, the computing device 900 corresponds to the server 110 in FIG. 1 and performs one or more of the functionalities described above with respect to the server 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPUs) 902 (e.g., processors), one or more input/output interfaces 903 (e.g., input devices, sensors, a network interface, a display, etc.), a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930, a storage module 933, a game engine 940, a cheat analyzer 950, and a load balancer 960. In some embodiments, one or more instructions are included in a combination of logic and non-transitory memory. The operating system 930 includes procedures for handling various basic system services and for performing hardware dependent tasks.

In some embodiments, the storage module 933 further includes a game data store 934 (e.g., the game data 112 in FIG. 1) for storing game data, a cheat data store 935 for storing cheat data (e.g., the cheat data 116 in FIG. 1) for storing vectors, the attributes, classifications, and/or the probability of suspected cheating, etc. such as the information as shown in FIGS. 4 and 5, and a counter cheat data store 936 for storing counter cheat data (e.g., the counter cheat data 117 in FIG. 1) for storing counter actions, counter cheat types, cross references to cheating classifications, etc. such as the information as shown in FIGS. 4 and 6. To that end, the content storage module 933 includes a set of instructions 935a and heuristics and metadata 935b.

In some embodiments, the game engine 940 (e.g., the game engine 111 in FIG. 1) is configured to provide game services (e.g., online gaming, multi-player games, etc.) and obtain the game data 934, including generating snapshots of the game data 934 for further analysis. To that end, the gaming engine 940 includes a set of instructions 941a and heuristics and metadata 941b.

In some embodiments, the cheat analyzer 950 (e.g., the cheat analyzer 115 in FIG. 1) is configured to analyze the game data 934, derive the cheat data 935 and the counter cheat data 936, and instruct the game engine 940 to apply counter cheats. In some embodiments, the cheat analyzer 950 further includes a game data extractor 951 (e.g., the game data extractor 120 in FIG. 1) for extracting features from snapshots provided by the game engine 940 and a learning network 952 (e.g., the learning network 125 in FIG. 1) for providing a probability of suspected cheating. To that end, the cheat analyzer 950 includes a set of instructions 953a and heuristics and metadata 953b.

In some embodiments, the load balancer 960 (e.g., the load balancer 113 in FIG. 1) is configured to balance the loads on multiple instances of the game engine 111 and/or nodes in the network of the gaming environment. In some embodiments, the load balancer 960 also stores the network traffic information as part of the game data 934 for further analysis. To that end, the load balancer 960 includes a set of instructions 961a and heuristics and metadata 961b.

Although the storage module 933, the game engine 940, the cheat analyzer 950, and the load balancer 960 are illustrated as residing on a single computing device 900, it should be understood that in other embodiments, any combination of the storage module 933, the game engine 940, the cheat analyzer 950, and the load balancer 960 can reside in separate computing devices in various embodiments. For example, in some embodiments, each of the storage module 933, the game engine 940, the cheat analyzer 950, and the load balancer 960 resides on a separate computing device.

Moreover, FIG. 9 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a server including one or more processors and a non-transitory memory, wherein the server includes a game engine connected to a plurality of client devices via a network, a cheating analyzer coupled with the game engine and the non-transitory memory stores game data from the game engine, cheat data and counter cheat data;
identifying suspected cheating originated from a first client device in a game provided by the game engine by analyzing the game data, wherein the game data associated with the game are exchanged via the network between the game engine and one or more client devices;
determining a probability of the suspected cheating based on the cheat data derived from the game data;
selecting a counter cheat of the suspected cheating corresponding to the probability based on the cheat data and the counter cheat data assigned to counter one or more classifications associated with the suspected cheating; and
applying, via transmitting instructions to a second client device through the network, the counter cheat approximate the probability in the game.

2. The method of claim 1, wherein identifying the suspected cheating originated from the first client device in the game includes:
analyzing network traffic associated with the game in the network;
detecting an anomaly in the network traffic originating from the first client device used by a player; and
extracting and storing in the cheat data a player identifier of the player, a device identifier of the first client device, a detector identifier, and actions associated with the suspected cheating in response to detecting the anomaly.

3. The method of claim 1, wherein determining the probability of the suspected cheating based on the cheat data derived from the game data includes:
deriving from the game data snapshots of the game a first feature vector in a first period and a second feature vector in a second period;
providing the first feature vector and the second feature vector to one or more neural networks; and
predicting by the neural network the probability of the suspected cheating as a probability of the second feature vector being a successor of the first feature vector.

4. The method of claim 3, wherein the cheating analyzer includes the one or more neural networks, the one or more neural networks include a generative neural network and a discriminative neural network, and the method further includes:

training the generative neural network to generate cheats for the discriminative neural network; and
providing features extracted from the snapshots to the discriminative neural network to predict the probability of the suspected cheating.

5. The method of claim 1, further comprising:
monitoring the game to detect a new act of cheating;
classifying the new act of cheating in the cheat data based on a motive associated with the new act of cheating and classifications in the cheat data;
assigning one or more counter cheats to the new act of cheating countering the motive; and
updating the counter cheat data to include the one or more counter cheats.

6. The method of claim 1, further including:
deploying local copies of the cheating analyzer to a plurality of devices; and
distributing over the network at least a portion of the cheat data and the counter cheat data to the plurality of devices each executing an instance of the game, wherein each of the local copies uses at least the portion of the cheat data and the counter cheat data to facilitate one or more of identifying the suspected cheat, determining the probability of the suspected cheating, selecting the counter cheat, and applying the counter cheat approximate the probability in the game.

7. The method of claim 6, wherein:
identifying the suspected cheating in the game includes receiving over the network the cheat data from a respective device of the plurality of devices; and
the cheat data are obtained by a respective local copy of the cheating analyzer and transmitted to the server over the network.

8. The method of claim 1, wherein obtaining selecting the counter cheat of the suspected cheating corresponding to the probability based on the cheat data and the counter cheat data includes:
classifying the cheat data based on personas representing cheating motives; and
applying a tit-for-tat policy to assign counter cheats for countering the cheating motives associated with the personas.

9. The method of claim 8, wherein the first client device is the same as the second client device, and wherein:
identifying the suspected cheating in the game includes identifying the suspected cheating originating from the first client device used by a player; and
applying the counter cheat approximate the probability in the game includes reducing capabilities of the player corresponding to the respective cheating motives at the first client device by a percentage equivalent to a value of the probability.

10. The method of claim 8, wherein the first client device is different from the second client device, and wherein:
identifying the suspected cheating in the game includes identifying the suspected cheating towards a player at the second client device; and
applying the counter cheat approximate the probability in the game includes enhancing capabilities of the player corresponding to the respective cheating motives at the second client device by a percentage equivalent to a value of the probability.

11. The method of claim 1, wherein:
the game is a massively multi-player online game (MMOG) provided by the game engine;

identifying the suspected cheating in the game includes identifying a player at the first client in a team of the MMOG at the plurality of client devices conducted the suspected cheat; and
notifying, via the network, members of the team at the plurality of client devices upon determining the probability of the suspected cheating satisfying a criterion.

12. The method of claim 1, wherein:
determining the probability of the suspected cheating based on the cheat data includes determining the probability of an act of cheating associated with the suspected cheating by a player at the first device in the game; and
applying the counter cheat approximate the probability in the game includes:
determining whether the probability of the suspected cheating calculated for the act of cheating by the player at the first client device satisfies a threshold; and
applying the counter cheat with the probability in the game in accordance with a determination of the probability satisfying the threshold.

13. A system comprising:
a server including one or more processors and a non-transitory memory, wherein the server includes a game engine connected to a plurality of client devices via a network, a cheating analyzer coupled with the game engine and the non-transitory memory stores game data from the game engine, cheat data and counter cheat data, and wherein the cheating analyzer is operable to:
identify suspected cheating originated from a first client device in a game provided by the game engine by analyzing the game data, wherein the game data associated with the game are exchanged via the network between the game engine and one or more client devices;
determine a probability of the suspected cheating based on the cheat data derived from the game data;
select a counter cheat of the suspected cheating corresponding to the probability based on the cheat data and the counter cheat data assigned to counter one or more classifications associated with the suspected cheating; and
apply, via transmitting instructions to a second client device through the network, the counter cheat approximate the probability in the game.

14. The system of claim 13, wherein identifying the suspected cheating originated from the first client device in the game includes:
analyzing network traffic associated with the game in the network;
detecting an anomaly in the network traffic originating from the first client device used by a player; and
extracting and storing in the cheat data a player identifier of the player, a device identifier of the first client device, a detector identifier, and actions associated with the suspected cheating in response to detecting the anomaly.

15. The system of claim 13, wherein determining the probability of the suspected cheating based on the cheat data derived from the game data includes:
deriving from the game data snapshots of the game a first feature vector in a first period and a second feature vector in a second period;
providing the first feature vector and the second feature vector to one or more neural networks; and predicting by the neural network the probability of the suspected cheating as a probability of the second feature vector being a successor of the first feature vector.

16. The system of claim 15, wherein the cheating analyzer includes the one or more neural networks, the one or more neural networks include a generative neural network and a discriminative neural network, and the cheating analyzer is further operable to:
train the generative neural network to generate cheats for the discriminative neural network; and
provide features extracted from the snapshots to the discriminative neural network to predict the probability of the suspected cheating.

17. The system of claim 13, wherein the cheating analyzer is further operable to:
monitor the game to detect a new act of cheating;
classify the new act of cheating in the cheat data based on a motive associated with the new act of cheating and classifications in the cheat data;
assign one or more counter cheats to the new act of cheating countering the motive; and
update the counter cheat data to include the one or more counter cheats.

18. The system of claim 13, wherein the server is operable to:
deploy local copies of the cheating analyzer to a plurality of devices; and
distribute over the network at least a portion of the cheat data and the counter cheat data to the plurality of devices each executing an instance of the game, wherein each of the local copies uses at least the portion of the cheat data and the counter cheat data to facilitate one or more of identifying the suspected cheat, determining the probability of the suspected, selecting the counter cheat, and applying the counter cheat approximate the probability in the game.

19. The system of claim 18, wherein:
identifying the suspected cheating in the game includes receiving over the network the cheat data from a respective device of the plurality of devices; and
the cheat data are obtained by a respective local copy of the cheating analyzer and transmitted to the server over the network.

20. The system of claim 13, wherein selecting the counter cheat of the suspected cheating corresponding to the probability based on the cheat data and the counter cheat data includes:
classifying the cheat data based on personas representing cheating motives; and
applying a tit-for-tat policy to assign counter cheats for countering the cheating motives associated with the personas.

* * * * *